United States Patent
Appelberg

(10) Patent No.: US 7,884,585 B2
(45) Date of Patent: Feb. 8, 2011

(54) PRE-BIASED CIRCUIT FOR SYNCHRONOUS RECTIFIED POWER CONVERTERS

(75) Inventor: Mikael Appelberg, Kalmar (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 418 days.

(21) Appl. No.: 12/094,840

(22) PCT Filed: Jul. 6, 2006

(86) PCT No.: PCT/SE2006/050247

§ 371 (c)(1),
(2), (4) Date: May 23, 2008

(87) PCT Pub. No.: WO2007/061369

PCT Pub. Date: May 31, 2007

(65) Prior Publication Data

US 2010/0060253 A1    Mar. 11, 2010

(30) Foreign Application Priority Data

Nov. 23, 2005    (SE) .................................. 0502613

(51) Int. Cl.
*G05F 1/10* (2006.01)
*G05F 1/12* (2006.01)
*H02M 5/42* (2006.01)

(52) U.S. Cl. ........................... 323/234; 323/297; 363/84
(58) Field of Classification Search .................. 323/234, 323/271, 282, 285, 297; 363/84, 89
See application file for complete search history.

(56) References Cited

U.S. PATENT DOCUMENTS

| 6,426,886 | B1 * | 7/2002 | Goder ........................ 363/56.1 |
| 6,683,798 | B2 * | 1/2004 | Matsuura et al. .............. 363/17 |
| 2007/0182392 | A1 * | 8/2007 | Nishida ...................... 323/282 |
| 2009/0251122 | A1 * | 10/2009 | Singnurkar .................. 323/311 |
| 2010/0019749 | A1 * | 1/2010 | Katsuya et al. ............. 323/282 |
| 2010/0052628 | A1 * | 3/2010 | Khayat et al. ............... 323/234 |

* cited by examiner

*Primary Examiner*—Adolf Berhane

(57) ABSTRACT

The present invention relates to voltage converters and especially to a control circuit with an input from the voltage converter output and arranged to control the voltage level on the voltage converter output. The problem addressed relates to the situation when there is a pre-bias voltage on the converter output at the moment it is switched on. The object of the control circuit is to increase the voltage on the converter output fast and avoiding any drain of voltage or current from the output at the start up sequence. This is performed by a comparator in the control circuit that is arranged to compare the reference voltage with a division of the output voltage and if the reference voltage is lower that the divided output voltage the reference voltage is increased at the comparator output. The comparator circuit includes an OP-amplifier.

3 Claims, 3 Drawing Sheets

PRE-BIASED CIRCUIT FOR SYNCHRONOUS RECTIFIED POWER CONVERTERS

TECHNICAL FIELD OF THE INVENTION

The present invention relates to electrical voltage converters for supplying power to DC electrical equipment and especially for a control circuit for controlling the output voltage of the converter.

DESCRIPTION OF RELATED ART

Modern electrical voltage converters are generally equipped with a synchronous rectifier. This increases the converter efficiency. A drawback is though that it enables transport of energy in the reverse direction, from the converter output to the input.

Generally, voltage converters are equipped with a feedback control circuit that has an input from the converter output and controls the voltage level at the converter output, to stabilize at a target level. In general this is made by a compensator network, within the control circuit, and arranged to compare the voltage at the converter output with an internal reference voltage.

Voltage converters of this type are frequently switched on and off. The control circuit is then also switched on and off. At switch on the control circuit shall control the output voltage of the converter to rise from zero to the target level in a defined and preferably monotonically fasion, i.e. continuously rising until the target level is reached. The rise of the voltage on the converter output follows a reference voltage in the control circuit. At start up of the converter and the control circuit the reference voltage is produced by charging a capacitor from an internal current source.

The voltage converter is generally implemented to provide electrical power to other devices via an electrical bus. The devices may be different types of equipment, among them IC-circuits. There may also be more voltage converters connected for supplying power to the bus. The equipments often have capacitors in their connections to the bus.

At start up the time for the voltage converter to reach its target operation level should be enough for the voltage converter to be able to charge any capacitive loads connected to the bus. Of course, fast operation of the converter is also desired. The time for charging the reference voltage that controls the rise of the converter output voltage level, should be selected to balance the two needs.

A problem is that the equipment connected to the bus may pre-bias the voltage on the voltage converter output or capacitors placed on the bus may already be biased by the converter during a re-start. In other words, at the moment the voltage converter is switched on there already exists a voltage on its output. In such situation the control circuit functions to adjust the bus voltage according to the internal reference. As a result the voltage and current is drained from the bus in reverse direction, until the voltage has reached a level were it corresponds to the reference voltage, and thereafter ramps-up according to the normal startup behavior.

The decrease in the bus voltage and the reverse flow of current, may course sever damages to the equipment and/or circuits that should be fed with power from the bus 92, especially integrated circuits are vulnerable.

US patent application publication No. 2005/0212500 A1, discloses a solution to the above problem with a control circuit which is partly charged from the bus voltage before the voltage converter is switched on. In particular a reference voltage is pre-charged. When the converter and control circuit is switched on the bus voltage is compared with the pre-charged reference voltage. Due to the reference voltage is pre-charge the control circuit can operate the voltage converter to rise the output voltage from the pre-biased level or close to it. Therefore the drain voltage and current from the bus to the control circuit is reduced. A disadvantage is thought the long time it takes for the voltage to stabilize over the reference.

SUMMARY OF THE INVENTION

The problem addressed by the present invention is power drain from a converter output to its input, when it has a pre-biased voltage on its output at start up.

The present invention solves the problem with a control circuit that comprises a compensator network including a first OP-amplifier that is arranged to compare a first division of the converter output voltage with a reference voltage and regulate the voltage produced by the converter via an output of the first comparator. It also comprises a capacitor that is arranged to be charged from an internal voltage via a resistor, wherein the sizes of the resistor and the capacitor are selected to provide the desired start-up behaviour. Further is included a comparator with a second OP-amplifier that is arranged to compare a second division of the converter output voltage with a reference voltage, wherein the second division produces a lower voltage then the first division. The comparator is further arranged to increase the reference voltage in case it is lower than the second division of the converter voltage.

The comparator has capacity to charge the reference voltage very fast compared to the normal charging via the resistor.

Thereby the voltage on the converter output can rise from a pre-biased level to a level corresponding to that on the converter output quickly. Thereby any voltage and current drain from the converter output to its input is diminished, if not completely avoided.

As compared to the prior art solution of the problem, the solution according to the present invention has the advantage of faster charging of the reference voltage to a level that corresponds to that of the pre-charged level on the converter output. Thereby any remaining power drain from the converter output to its input is diminished and so the risk of damaging equipment and electrical circuits that are connected to the converter output.

DESCRIPTION OF PREFERRED EMBODIMENTS

Figure 1:
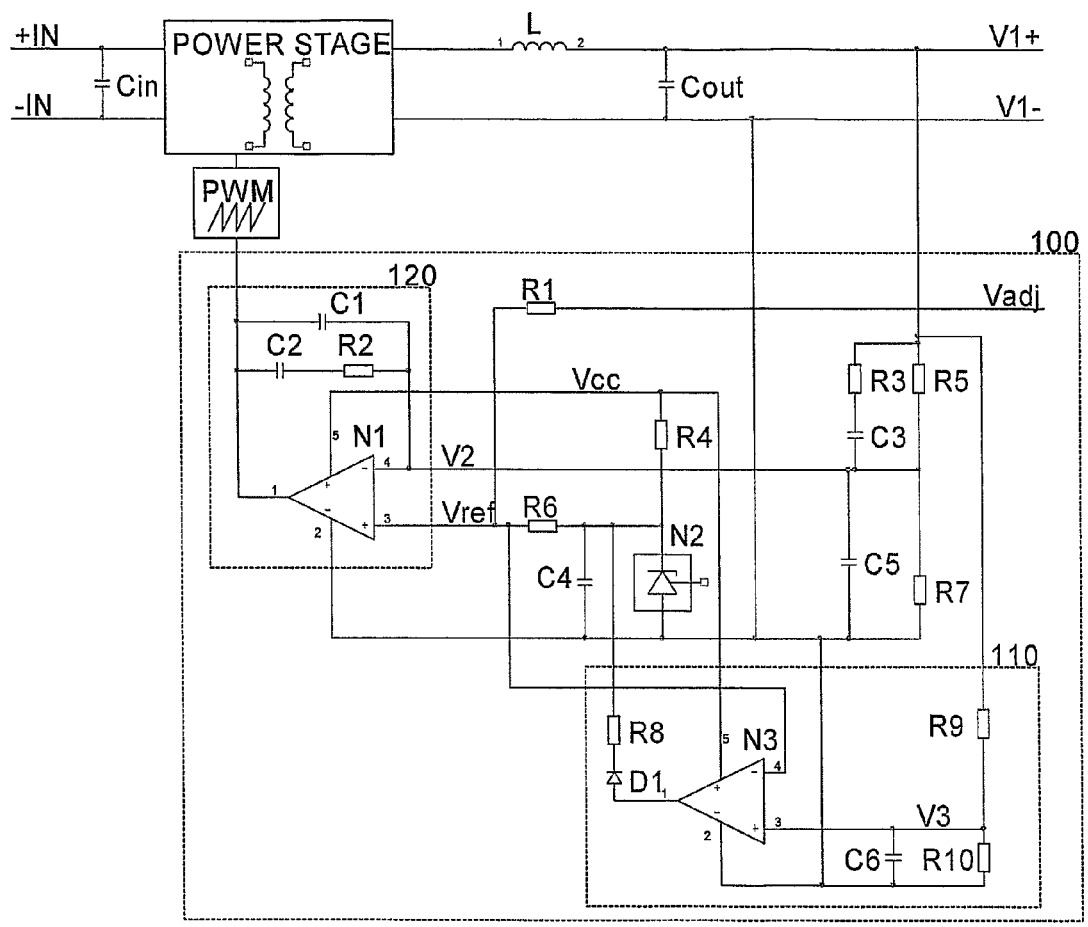
FIG. 1 is a circuit scheme of the inventive control circuit 100.

The invention is a control circuit for regulating the output voltage of voltage converter. FIG. 1 is a circuit scheme, disclosing an electrical voltage converter 90, and a control circuit 100 for regulating the output power of the voltage converter. The function of the voltage converter 90 is to supply DC power to a bus 92. The purpose of the bus 92 is to feed electrical power to equipment and circuits connected to the bus, these are however not part of the invention and not disclosed in figure B. The control circuit 100 functions to regulate the buss voltage $V_{1+}$–$V_{1-}$ to a target level. The control circuit 100 includes a compensator network 120 and a comparator circuit 110. The compensator network 120 comprises an OP-amplifier N1 with an inverted RC feedback loop comprising impedances C1,C1,R2 to signal input 4 on the OP-amplifier N1. Also the bus 92 voltage $V_{1+}$–$V_{1-}$ is via power division over resistors R5 and R7 fed to the signal input 4 of the OP-amplifier N1. The compensator network with signal connections C3,R3,R5 is of the commonly well known PID-type, which for example is described in Texas Instruments data sheet SLUS540C, published December 2002, revised July 2003, se especially page 16.

The compensator network 120 functions to diminish, if not to completely delete, any difference in electrical potential between the signal on the OP-converter N1s negative input 4 and a reference voltage Vref, limited by the voltage reference N2, on its positive input 3. Any difference between the voltages is amplified at the OP-amplifier N1 output and connected to the power converter 90 for regulating its output voltage V1+, V1–.

The reference voltage Vref is related to the bus voltage V1+,V1– by division over resistors R5 and R7. This can be understood if it is assumed that the OP-amplifier N1 has ideal quality, the voltage over resistor R6 and capacitor C4 is equal the voltage over resistor R7. Assuming the first OP-amplifier N1 has ideal characteristics, no current flows into it its reference voltage input 3. The current for charging the capacitor C4 is provided from an internal auxiliary voltage Vcc via a resistor R4 connected to the capacitor C4. The time it takes for charging the capacitor C4 to the value of the reference voltage Vref is determined by the values of the capacitor C4, the resistor R4, the auxiliary voltage Vcc and the voltage of the reference N2.

The capacitor C4 will be charged up to the breakdown voltage of the reference N2. At that time the reference will start to sink current and stabilize the reference voltage. The compensator will control the output of the converter 90 to a level proportional to the reference voltage and compensate for variations on the bus 92 voltage. The capacitor C4 will both act as decoupling of the reference N2 and provide the start-up behaviour of the product.

The voltage converter 90, 100 of FIG. 1 can frequently be switched on and off. When it is switched on, and there is no prior voltage on the power buss 92, i.e. $V_{1+}$=$V_{1-}$, the voltage will rise as described above. When the voltage over capacitor C4 equals the zener voltage of the Zener-diod N2 in parallel with the capacitor C4 and the target output voltage level of the converter is reached.

In case there already exist an output voltage on the bus 92 when the voltage converter 90 and the control circuit 100 is switched on, i.e. the bus voltage is pre-biased, the comparator circuit 110 functions to quickly increase the reference voltage Vref to a level that corresponds to that it would have had, if the pre-biased bus voltage level had been the result of a non-biased start-up sequence. This is the essence of the present invention.

The comparator circuit 110, comprises a second OP-amplifier N3 with a first input 6 for receiving the reference voltage Vref and a second input 5 for receiving a second input signal V3. The second signal V3 is proportional to the voltage level V1+–V1– on the bus 92, and is lower than the first input signal V2 that is fed to the first OP-amplifier N1. In a situation were the second input signal V3 is greater than the reference voltage Vref the second OP-amplifier N3 increases the signal at its output and feeds it to reference voltage Vref input on the first OP-amplifier N1 via a resistor R6. Thereby the capacitor C4 is quickly charged and the reference voltage Vref risen.

Assuming the capacitors C3, C5 are charged and no current flowing through them, the first signal V2 is produced by voltage division over resistors R5 and R7:

$$V2=(V1+-V1-)R7/(R5+R7)$$

Under the same conditions, the second signal V3 is produced by voltage division over resistors R9 and R10:

$$V3=(V1+-V1-)R10/(R9+R10)$$

In order for the comparator circuit 110 to be activated only when there is a pre-biased voltage on the bus 92 at the moment when the voltage converter 90 and the control circuit 100 are switched on, the ratio between the resistors must be:

$$R10/R9<R7/R5$$

By this ratio it is ensured that V2>V3 and the comparator circuit will cease charging the reference voltage Vref when Vref has reached a level that almost corresponds to that of the pre-biased bus voltage. Thereafter the reference voltage is charged from the internal auxiliary voltage supply Vcc.

Figure 2:
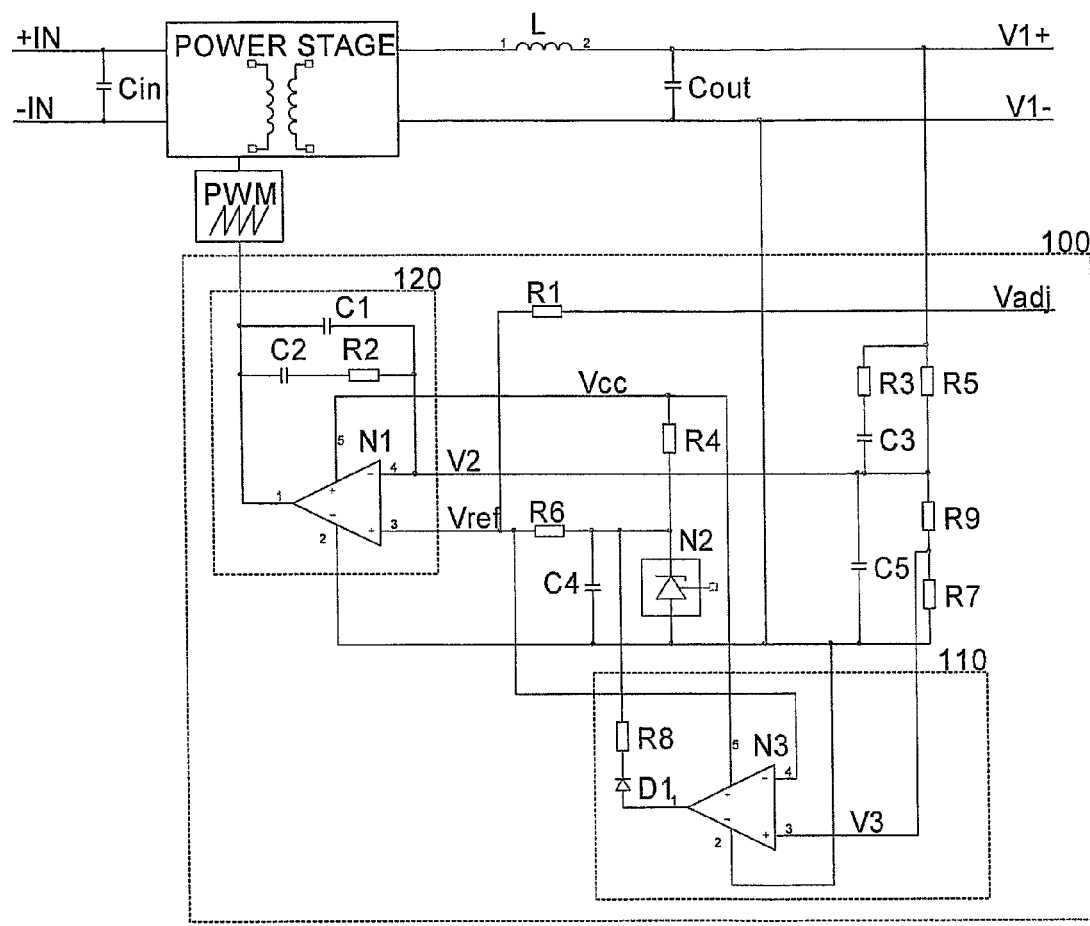
FIG. 2 is a circuit scheme of the inventive control circuit 100, with an alternative voltage division over resistors.

FIG. 2 discloses an alternative circuit scheme of the control circuit 100, which differ from that of FIG. 1 in that the voltage division of first and second signals V2 and V3 share the same resistors R5, R9 and R7. Thus only three in stead of four resistors are needed as in the case of figure B. With the construction of FIG. 2, first and second signals V2 and V3 are voltage divided from the bus voltage by:

$$V2=(V1+-V1-)(R7+R9)/(R7+R9+R5)$$

$$V3=(V1+-V1-)R7/(R7+R9+R5)$$

In FIG. 2 the voltage connections to the internal power supplies of the two OP-amplifiers N1, N3 are also shown, and that are hidden in FIG. 2.

The capacitors C3, C5 in parallel with the resistors are only used for high frequency filtering and do not affect the voltage division.

In order for the advantage of the comparator 110 to be fully understood the start-up sequence of the power converter 90 and control circuit 100 will be discussed with respect to a control circuit 100 including the comparator 110 versus when the comparator 110 is lacking the control circuit 100. Assume the comparator circuit 110 would not be included in the control circuit 100, and there is a pre-bias voltage at the bus 92 at the switched on moment, the first signal V2 at the first OP-amplifier N1 input 4 would be higher than the reference voltage Vref at the other input 3. The compensator network 120 would then control the power converter 90 to decrease the bus voltage V1+, V1– to a level that balance to the reference voltage Vref.

Figure 3:
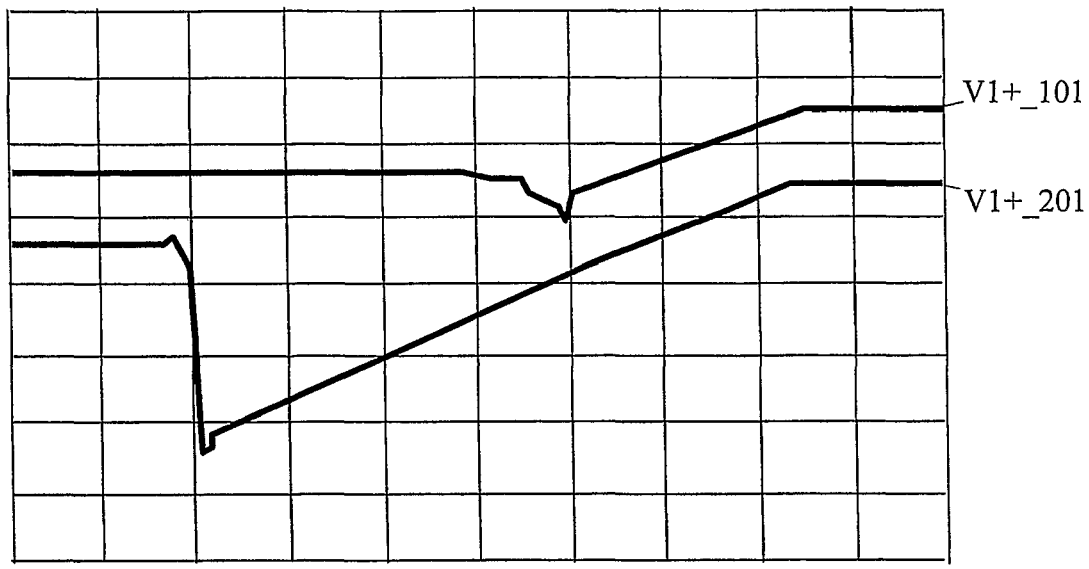
FIG. 3 is diagram disclosing output voltage from the voltage converter at pre-biased start up.

Measurements have been made on the performance of the control circuit as disclosed in FIG. 1 with and without the comparator circuit 11 being included. FIG. 3 is a diagram with two curves V1+_101 and V1+_201 disclosing the measures on the bus voltage V1+–V1– as a function of time. The first of the curves V1+_101 illustrates the bus voltage V1+–V1– when the comparator circuit 110 is included in the control circuit 100 and the second of the curves V1+_201 represents the bus voltage V1+–V1– when the comparator 110 is lacking. On the horizontal axis time is represented by 2 ms per division and on the vertical axis voltage is represented by 1 volt/division. Neither the voltage level on the vertical axis nor the timing on the vertical axis are absolute values, and the curves are separated horizontally and vertically to ease the illustration of their separate properties. For both curves there is a pre-bias voltage of 4V on the bus 92 before the voltage converter 90 and the control circuit 100 are switched on, which results from the voltage converters 90 internal capacitor $C_{out}$ of 500 µF is pre-charged. There is no load connected to the bus 92. At the moment the voltage converter 90 and control circuit 100 are switched on the voltage drop for both curves V1+_101, V1+_201. While the drop is about 3 V for the second curve V1+_201, it is just about 0.5 V for the first curve V1+_101. The first curve V1+_101 reaches a target voltage level of 5V about 6 ms after the switch on, while it takes more than 12 ms for the second curve V1+_201 to reach the target level of 5V.

Figure 4:
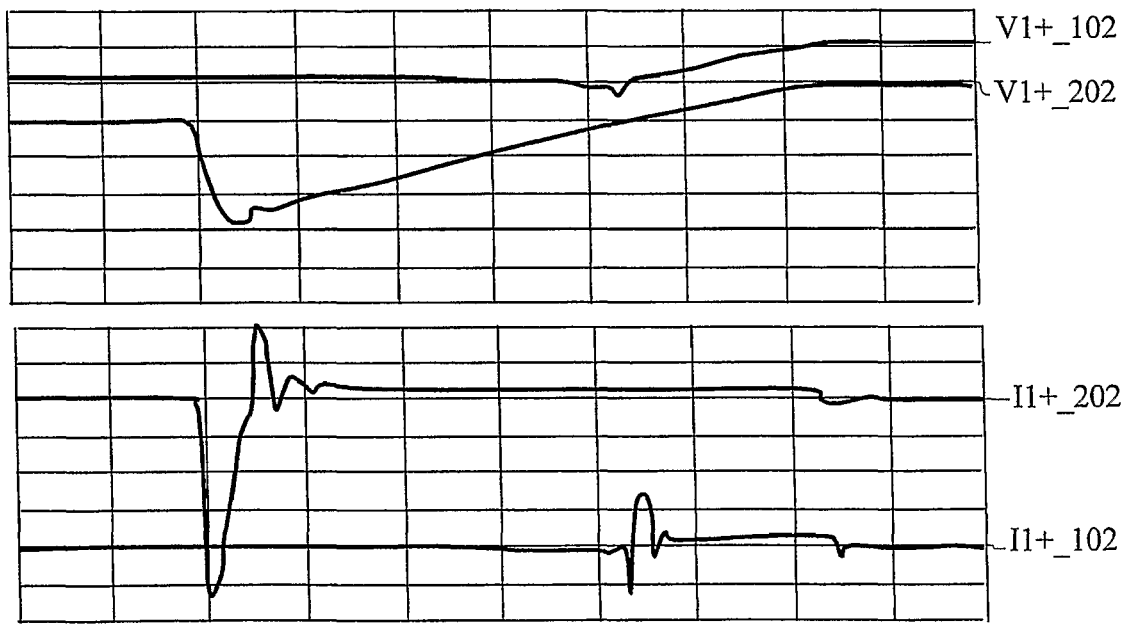
FIG. 4 is diagram disclosing output voltage and current from the voltage converter at pre-biased start up.

In common with FIG. 3, FIG. 4 also discloses the start-up of the voltage converter 90. A difference is, though, there is a 10 mF capacitive load with an ESR of 2 mΩ on the bus 92. In addition to two voltage curves V1+_102, V1+_202 respectively representing the control circuit including the comparator circuit 110, and the comparator circuit 110 is lacking in the control circuit 100, the lower half of FIG. 4 discloses two curves I1+_102, I1+_202 of the currents on the bus 92, respectively for the control circuit including the comparator circuit 11, and lacking it. The current level on the horizontal axis is 10 A per division.

With the load coupled to the bus 92 as illustrated in FIG. 4, the real benefit of the control system with the comparator 11 is apparent. For the control circuit lacking the comparator 110, the second current curve I1+_202 drops 50 A at switch on. This peak current flows via the voltage converter in reverse direction, from the bus 92 to the voltage converter 90 input. The reverse peak current is modestly 10 A with the comparator 110 included in the control circuit 100. The voltage drops from 4.1 to 3.9 V as disclosed by first curve V1+_102 when the comparator 110 is included in the control circuit 100, while the second curve V1+_202 discloses the voltage drops from 4.0 V to 1.2 V without the comparator 11. This means energy drain from the bus. With the comparator 110 the reversed energy is modestly 8 mJ, while it is 73 mJ if the comparator 110 is lacking the control circuit 100.

The small energy reversal that remains with the comparator circuit at pre-biased start-up, is related to the reaction time of the control loop and the charging time of capacitor C4.

A first advantage afforded by the addition of the comparator 110 is that the target bus voltage of 5V is reached very fast after the switch on and the circuits and equipment are operable. An even more important advantage is though that the risk of damages on equipment connected to the bus 92 is reduced when the reverse peak current and energy is decreased.

The target level of the voltage converter 90 output voltage level V1+–V1– is basically regulated by the Zener-diod turn over voltage. Let us assume that the first OP-amplifier N1 has ideal characteristics, which is of course not totally correct, no current then flows to its inputs 3, 4 and there is no difference in voltage between the inputs because any such difference is immediately regulated by the feedback loop C1, C2, R2. With reference to FIG. 1, the potential drop over resistor R6 and capacitor C4 in parallel with the Zener-diod N2, then equals the potential drop over the resistor R7 and parallel capacitor C5. For the basic case there is no current over resistor R6, and the capacitor C4 is charged until maximum voltage over the Zener-diod N2 is reached. The voltage over resistor R7 equals that over capacitor C4 and the parallel Zener-diod N2. The voltage over resistors R5 and R7 series is the same as the bus voltage V1+–V1+.

The reference voltage Vref is adjustable from a connection over a resistor R1 to the voltage reference input Vref at the first OP-amplifier N1. By adjusting the voltage from Vadj a current courses a potential drop or increase over resistor R6 coupled in series with the parallel capacitor C4 and Zener-diod N2. As result the potential drop over resistor R7 is changed, and the voltage level V1+–V1+ is changed according to:

$V1+-V1-=Vref \times (1+R5/R7)$

The essence of the present invention is the comparator for boosting a reference voltage to its preferred level at start up of the voltage converter 90 and the connected control circuit 100. The addition of a comparator as disclosed is applicable also if the compensator network 120 has an alternative circuit scheme as long as it functions to regulate the voltage level on the converter 90 output in a stable loop. It has inventive use when the reference voltage is charged over a capacitor when the control circuit and voltage converter is switched on.

The invention claimed is:

1. A control circuit for controlling the output voltage V1+–V1– of a connected voltage converter, comprising:
   a connection to said voltage converter output for receiving a first voltage V1+–V1– produced by the voltage converter;
   impedances arranged to divide the first voltage V1+–V1– into a first signal V2 and a second signal V3, wherein V2>V3;
   a compensator network comprising a first amplifier with a first signal input for receiving said first signal V2, a second signal input for receiving a reference voltage Vref, and arranged to compare the first signal V2 with the reference voltage Vref and produce at an output a comparison signal for controlling the voltage level V1 of the voltage converter;
   a capacitor having a first side connected to the lowest potential of the circuit, having a second side connected to an a resistor for receiving a charging current via the resistor, further on the second side connected to the first signal input of the first amplifier, and being arranged for stabilizing the reference voltage Vref;
   a comparator circuit comprising a second amplifier with a first signal input receiving the reference signal Vref and, a second signal input receiving the second signal V3, and arranged for comparing the second input signal V3 with the reference signal Vref and increase the reference signal Vref at its output if Vref<V3.

2. The control circuit of claim 1 wherein;
   said connection comprises a first and a second input respectively for receiving the positive voltage potential V1+ and negative voltage potential V1– of the voltage converter output, and wherein,
   said impedances for voltage division are resistors R7 and R5 coupled in series for producing the first signal V2 such that V2=(V1+–V1–) R7/(R7+R5).

3. The control circuit of claim 1 wherein said compensator network is an OP-amplifier with an inverted RC-feedback loop.

* * * * *